United States Patent
Koehler et al.

(10) Patent No.: US 10,518,908 B2
(45) Date of Patent: Dec. 31, 2019

(54) SPACECRAFT WITH SHAPE MEMORY POLYMER DEPLOYMENT MECHANISM

(71) Applicant: Raytheon Company, Waltham, MA (US)

(72) Inventors: Frederick B. Koehler, Tucson, AZ (US); Ward D. Lyman, Tucson, AZ (US); Matt H. Summers, Marana, AZ (US); Jeremy C. Danforth, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 852 days.

(21) Appl. No.: 14/921,545

(22) Filed: Oct. 23, 2015

(65) Prior Publication Data

US 2017/0113817 A1    Apr. 27, 2017

(51) Int. Cl.
*B64G 1/22* (2006.01)
*B64G 1/10* (2006.01)

(52) U.S. Cl.
CPC ............... *B64G 1/222* (2013.01); *B64G 1/10* (2013.01)

(58) Field of Classification Search
CPC ................................................... B64G 1/222
See application file for complete search history.

(56) References Cited

U.S. PATENT DOCUMENTS

| | | | |
|---|---|---|---|
| 6,175,989 B1 * | 1/2001 | Carpenter | B64G 1/222 136/245 |
| 7,728,267 B2 | 6/2010 | Sanderson et al. | |
| 7,777,165 B2 | 8/2010 | Sanderson et al. | |
| 7,939,178 B2 | 5/2011 | Sar et al. | |
| 8,016,249 B2 | 9/2011 | Sar et al. | |
| 8,387,536 B2 | 3/2013 | Sar et al. | |
| 9,695,586 B1 * | 7/2017 | Reading | E04B 1/34357 |

(Continued)

FOREIGN PATENT DOCUMENTS

| | | |
|---|---|---|
| DE | 102013201990 A1 | 8/2013 |
| WO | 2009059332 A1 | 5/2009 |

OTHER PUBLICATIONS

Yanju Liu et al.: "Shape Memory Polymers and Their Composites in Aerospace Applications: A Review", vol. 23, No. 2 Jan. 9, 2014.

(Continued)

*Primary Examiner* — Jessica B Wong
(74) *Attorney, Agent, or Firm* — Renner, Otto, Boisselle & Sklar, LLP

(57) ABSTRACT

A spacecraft, such as a satellite, uses a shape memory polymer actuator to deploy one or more deployable parts. The shape memory polymer actuator may be formed integrally with a deployable part and/or with a fuselage or other structure of the spacecraft, with the shape memory polymer actuator being for example a relatively thin portion of the shape memory polymer material of the integral structure. The shape memory actuator allows deployment of the deployable part(s) upon heating of the shape memory polymer material of the actuator, such as after the satellite has been launched into space. The heating may be caused by a heat source that is part of the spacecraft itself, or may be merely the result of exposing the spacecraft to solar heating after launch. The deployable part of the spacecraft may include any of a wide variety of parts that are used after launch.

14 Claims, 4 Drawing Sheets

(56) References Cited

U.S. PATENT DOCUMENTS

| | | | |
|---|---|---|---|
| 2005/0022465 A1* | 2/2005 | Warren | B64G 1/222 |
| | | | 52/653.2 |
| 2009/0072094 A1 | 3/2009 | Sanderson et al. | |
| 2009/0206192 A1 | 8/2009 | Sanderson et al. | |
| 2009/0286101 A1 | 11/2009 | Sar et al. | |
| 2010/0288870 A1 | 11/2010 | Geswender et al. | |
| 2011/0210209 A1 | 9/2011 | Taylor et al. | |
| 2013/0229709 A1* | 9/2013 | Newswander | G02B 23/02 |
| | | | 359/399 |
| 2014/0306473 A1 | 10/2014 | Koehler et al. | |

OTHER PUBLICATIONS

Steven C. Arzberger et al., "Elastic memory composites (EMC) for Deployable Industrial and Commercial Applications, "Smart Structures and Materials 2005: Industrial and Commercial Applications of Smart Structure Technologies, Proceedings of Spie vol. 5762, May 5, 2005.

* cited by examiner

SPACECRAFT WITH SHAPE MEMORY POLYMER DEPLOYMENT MECHANISM

FIELD OF THE INVENTION

The invention is in the field of spacecraft, and mechanisms for deploying parts of spacecraft.

DESCRIPTION OF THE RELATED ART

Satellites have long been used for a variety of operations, including imaging, data gathering, and telecommunications. Small satellites are a low-cost way of preforming simple functions, with many such low-cost satellites being launched, sometimes as add-on payloads for launches involving larger satellites.

There is a continuing need to augment the capabilities of such small satellites. At the same time there is a value to having the satellites fit into limited volume envelopes, and tighter mass constraints. Often satellites have parts that are deployed only in space, but mechanisms for such deployment can be complex, and can add significant volume, cost, and/or mass, sometimes making such make them undesirable for a given spacecraft platform.

SUMMARY OF THE INVENTION

A spacecraft, such as a satellite, has deployable part that is deployed by a shape memory polymer actuator.

A shape polymer actuator, for deploying a deployable part of a spacecraft, is integrally formed with the deployable part and/or with structure of the spacecraft, such as a fuselage of the spacecraft.

According to an aspect of the invention, a spacecraft includes: a fuselage; a deployable part that is deployable from the fuselage; and an actuator that is used to selectively deploy the deployable part. The actuator includes a shape memory polymer material that changes shape when heated in order to deploy the deployable part.

According to an embodiment of the device of any paragraph(s) of this summary, the actuator is integrally formed as a single continuous part with at least part of the deployable part.

According to an embodiment of the device of any paragraph(s) of this summary, the actuator is integrally formed as a single continuous part with at least part of the fuselage.

According to an embodiment of the device of any paragraph(s) of this summary, the actuator is a thinned portion of the single continuous part.

According to an embodiment of the device of any paragraph(s) of this summary, the actuator is additively manufactured.

According to an embodiment of the device of any paragraph(s) of this summary, the shape memory polymer material includes a filler that enhances ultraviolet (UV) light absorption.

According to an embodiment of the device of any paragraph(s) of this summary, the device further includes a heat source that is operatively coupled to the shape memory polymer material.

According to an embodiment of the device of any paragraph(s) of this summary, the actuator includes an electrical power source for electrical heating the shape memory polymer material.

According to an embodiment of the device of any paragraph(s) of this summary, the shape memory polymer material includes a filler that enhances electrical conductivity.

According to an embodiment of the device of any paragraph(s) of this summary, the actuator includes an electrically conductive material on a surface of the shape memory polymer material, with the electrically conductive material electrically coupled to the electrical power source.

According to an embodiment of the device of any paragraph(s) of this summary, the deployable part includes any of an antenna, a solar panel, an optical cover, or a sunshade.

According to an embodiment of the device of any paragraph(s) of this summary, the deployable part deploys by unrolling.

According to an embodiment of the device of any paragraph(s) of this summary, the deployable part deploys by unfolding.

According to an embodiment of the device of any paragraph(s) of this summary, the deployable part deploys by pivoting about the fuselage.

According to an embodiment of the device of any paragraph(s) of this summary, the actuator includes a shape memory alloy material in contact with the shape memory polymer material; and the shape memory alloy material also changes shape when heated, to provide a force that aids in deploying the deployable part.

According to another aspect of the invention, a method of deploying a satellite includes the steps of: separating the satellite from a mother craft; and deploying a deployable part of the satellite by heating a shape memory polymer material of an actuator, wherein the shape memory polymer material changes shape to deploy the deployable part.

According to an embodiment of the method of any paragraph(s) of this summary, the heating includes solar heating of the shape memory polymer material.

According to an embodiment of the method of any paragraph(s) of this summary, the heating includes electrically heating the shape memory polymer material.

According to a further aspect of the invention, a spacecraft includes: a fuselage; a deployable part that is deployable from the fuselage; and an actuator that is used to selectively deploy the deployable part. The actuator includes: a shape memory polymer material; and a shape memory alloy material operatively coupled to the shape memory polymer material. Heating of the shape memory polymer material and/or the shape memory alloy material deploys the deployable part.

According to an embodiment of the device of any paragraph(s) of this summary, the heating changes shape of the shape memory alloy to provide most of the force to deploy the deployable part.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A spacecraft, such as a satellite, uses a shape memory polymer actuator to deploy one or more deployable parts. The shape memory polymer actuator may be formed integrally with a deployable part and/or with a fuselage or other structure of the spacecraft, with the shape memory polymer actuator being for example a relatively thin portion of the shape memory polymer material of the integral structure. The shape memory actuator allows deployment of the deployable part(s) upon heating of the shape memory polymer material of the actuator, such as after the satellite has been launched into space. The heating may be caused by a heat source that is part of the spacecraft itself, or may be merely the result of exposing the spacecraft to solar heating after launch. The deployable part of the spacecraft may include any of a wide variety of parts that are used after launch, such as antennas, solar panels, sunshades, or optical covers.

Figure 1:
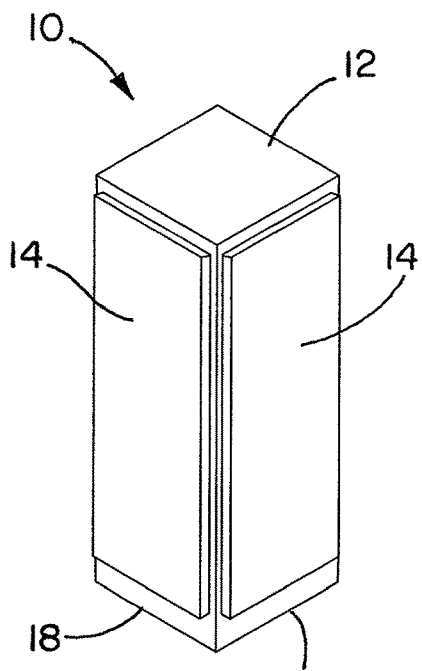
FIG. 1 is an oblique view of a spacecraft with a deployable part in a stowed condition, in accordance with an embodiment of the invention.
Figure 2:
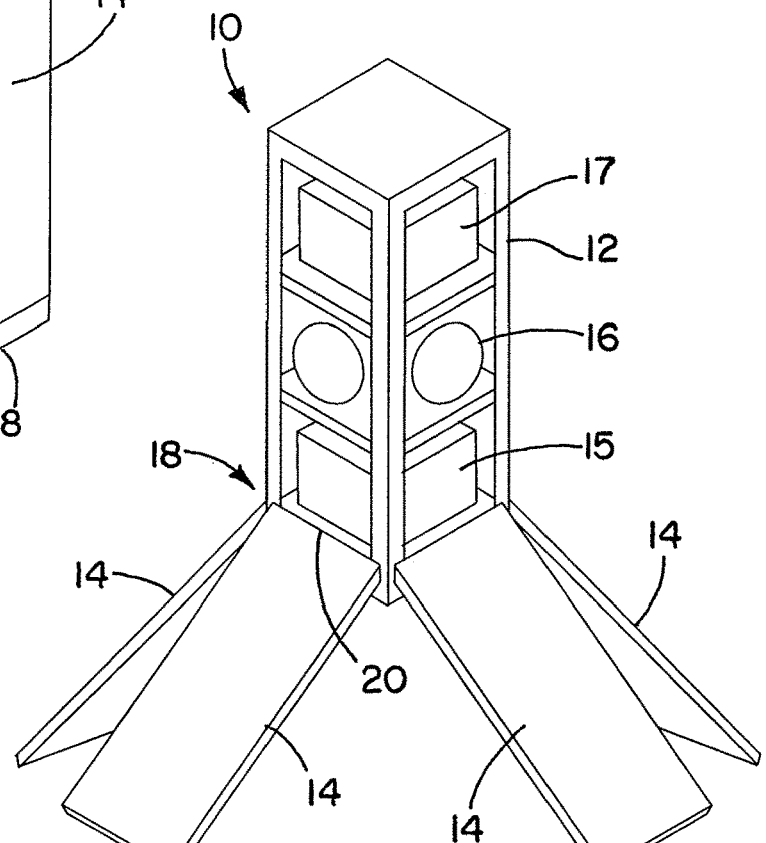
FIG. 2 is an oblique view of the spacecraft of FIG. 1, with the part in the deployed condition.

FIGS. 1 and 2 shows a spacecraft 10, a satellite which has a fuselage or frame 12, and a series of deployable parts or structures 14 that are mechanically coupled to the fuselage 12, and are able to deploy by rotating relative to the fuselage 12. The term "fuselage," is used herein to denote the central structure of the spacecraft 10. The fuselage 12 may be frame that contains elements such as a payload 15 (for example optics or other data-gathering equipment), reaction wheels 16 for attitude control of the spacecraft 10, and avionics 17. The deployable parts 14 shown each include both solar panels and an antenna, although many other types of parts may be deployable from the fuselage 12.

The deployable parts 14 open up from the closed (stowed) configuration shown in FIG. 1, to the open (deployed) configuration shown in FIG. 2. This is accomplished by actuators 18 that are used to deploy the parts 14 by rotating the parts 14 relative to the fuselage 12 at the location of the actuators 18. In the illustrated embodiment the deployable parts 14 each have a respective actuator 18. The actuators 18 are shape memory polymer material actuators that each include a shape memory polymer material 20 that changes shape upon heating, in order to move the parts 14 from the stowed position to the deployed position.

Shape memory polymer materials in general have a current form (shape), and a stored permanent form (shape). Once the stored permanent (memory) form has been set, the current (temporary, non-memory) form may be changed by a process of limited heating, deforming while the material is heated, and then cooling. It then maintains that current form until the material is heated again sufficiently to cause it to return to its permanent form, unless otherwise constrained. In order to put the material into a new permanent form, an even higher temperature is necessary.

The transition temperature $T_{trans}$ at which the material softens, and at which it tries to move to its permanent form (shape), may be the glass transition temperature $T_g$ of the material, or may be another temperature. The $T_{trans}$ is less than the permanent temperature $T_{perm}$ above which the material has its permanent shape reset.

In general, shape memory polymer materials have a modulus of elasticity that remains relatively constant with changes in temperature below $T_{trans}$. This means that the shape-memory polymer material may be substantially rigid at low temperatures. As the material is heated up to $T_{trans}$ it relatively quickly transitions to a low modulus of elasticity. This lower modulus of elasticity is maintained relatively constant until the melting temperature of the material is reached. This general comments regarding the behavior of the modulus of elasticity with temperature contrast shape memory polymers with other types of materials, for instance with typical thermoplastics.

The shape memory polymer material is configured to have a permanent (memory) shape that corresponds to the deployed configuration, and a temporary shape that corresponds to the stowed configuration. This means that sufficient heating of the shape memory polymer material causes the shape memory polymer material to have a shape memory force that tends (if unopposed) to cause the shape memory polymer material to reconfigure toward its permanent shape.

The heating may be solar heating caused by exposure of the spacecraft 10 (or part of the spacecraft 10) to sunlight, after its launch, such as after its separation from a mother ship. The shape memory polymer material 20 of the actuators 18 may include sunlight-absorbing materials, such as UV-absorbing materials, in order enhance solar heating in the shape memory polymer material 20.

Alternatively, the spacecraft 10 may have a self-contained device to heat (or aid in heating) the shape memory polymer material 20. For example, the spacecraft 10 may contain an electrical power source, such as a battery, that is used to electrically heat the shape memory polymer material, to change its shape. The electrical heating may include passing an electric current through the shape memory polymer material, to cause resistive heating within the shape memory polymer material. To facilitate this process the shape memory polymer material may include electrically conductive fillers, coatings, or high resistivity wires passing through the material. Examples of conductive fillers would be metal particles. Metal plating could be used for external heating via current application. A loaded or coated polymer may also be heated effectively with microwave radiation.

Shape memory polymer materials may change shape slowly when heated, and/or may provide only a small actuating force for moving the deployable parts 14. However these potential drawbacks may be of minor importance for use as the actuators 18 in the spacecraft 10. This is at least because 1) only small forces are required for the actuator to move the parts 14, and 2) relatively slow deployment times may be acceptable for deployment of the parts 14. In space there is no gravity force from the weight of the parts 14 to overcome in deploying the parts 14, so a small shape memory force may be sufficient for deployment. And a slow deployment time, even on the order of 15 minutes or so, may be acceptable performance as part of a satellite deployment process.

Figure 3:
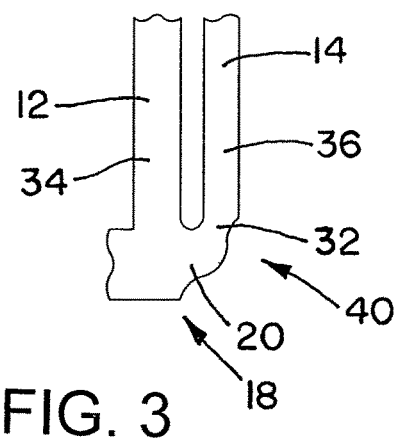
FIG. 3 is a side view showing details of one possible configuration of a shape memory polymer actuator of the spacecraft of FIG. 1, with the deployable part in the stowed configuration.

The shape memory polymer actuators 18 may have any of a wide variety of suitable configurations. With reference now to FIG. 3, in one configuration an actuator 18 may be a thinned portion 32 of shape memory polymer material at the point where pivoting (rotation) of the part 14 relative to the fuselage 10 occurs. The thinned portion 32 is flanked at either end by thicker portions 34 and 36 of shape memory polymer material 20. The thicker portions 34 and 36 are configured to change shape less than (or substantially not at all) the material in the thinner portion 32. The thinner portion 32 and the thicker portions 34 and/or 36 may be integrally formed together as a single piece of continuous material 40, and the composition of the shape memory polymer material may be the same throughout all of the portions 32-36. The thicker portions 34 and/or 36 may be portions of the fuselage 10 and/or the part 14. In some embodiments substantial portions of the fuselage 10 and/or the deployable part 14 may have the actuator 18 integrally formed with them, as continuous pieces 40 made of the shape memory polymer material.

Figure 4:
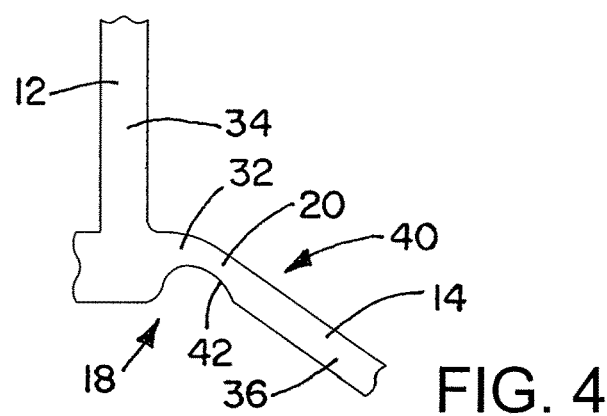
FIG. 4 is a side view showing details of the shape memory polymer actuator of FIG. 2, with deployable part in the deployed configuration.

The thinned portion 32 may transition smoothly to the thicker portions 34 and 36. For example, one face of the thinned portion 32 may have a curved shape 42 when the part 14 is deployed, as shown in FIG. 4.

The shape memory polymer material 20 of the actuator 18 and perhaps of portions or all of the fuselage 12 and the deployable part 14, may be produced in any of a variety of suitable methods. In one embodiment the shape memory polymer material may be additively manufactured, such as a by a three-dimension printing method, an example of a suitable such method being fused deposition modeling (FDM) or selective extrusion of shape polymer material. Other additive manufacturing techniques may be used instead such as stereo lithography (SLA), selective laser sintering (SLS) or other technologies capable of printing a thermoplastic or thermoset shape memory polymer. Additive manufacturing techniques have the advantage of allowing complicated structures to be built up layer by layer, enabling relatively simple manufacturing of structures which would be difficult to produce by other methods. For example, structures with internal hollows can be produced.

Another alternative manufacturing method is molding, such as injection molding. As noted above, there may be some configurations for which molding is difficult or impossible. In addition, molding requires relatively expensive tooling, such as production of a mold. In situations where only a few parts are to be made of a given configuration, the tooling costs involved with molding may give additive manufacturing a cost advantage.

Casting is another possible manufacturing method. As with molding, casting may have tooling costs that make it more costly than additive manufacturing methods, especially for parts that are produced only in a small volume.

Figure 5:
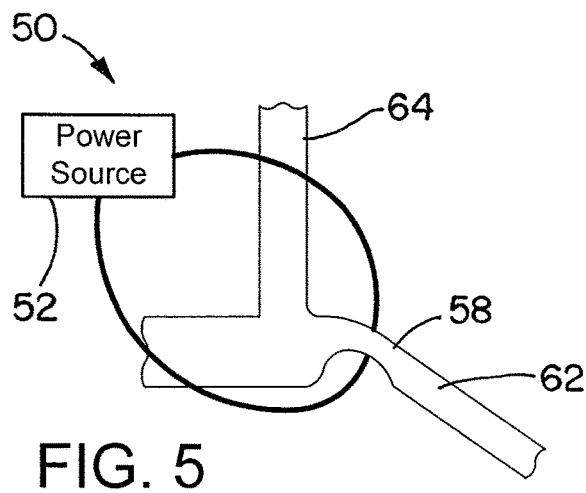
FIG. 5 is a side view of a shape memory polymer actuator, in accordance with another embodiment of the invention.

FIG. 5 illustrates a variation discussed earlier, in which a spacecraft 50 has an electrical power source 52 is coupled to a shape memory polymer material 54 as part of a deployment actuator 58, in order to provide heating to the actuator 58 to cause its shape memory polymer material to change shape, to deploy a deployable part 62 by rotating the part 62 relative to a frame or fuselage 64. The power source 52 may be a battery, or another suitable power source. The heating may be accomplished by resistive heating in the shape memory polymer material 54 itself. Alternatively a separate electric heater may located on or near the shape memory polymer material 54, in order to heat the material. Electrical heating may be used in conjunction with solar heating, or as a backup mechanism to solar heating.

Figure 6:
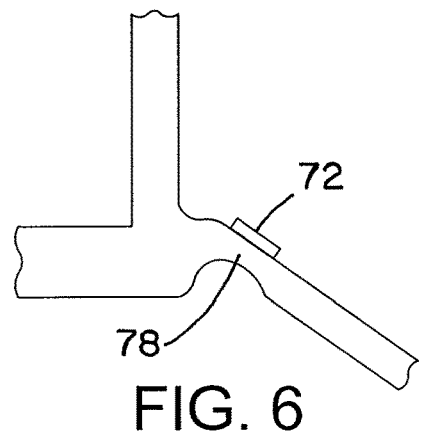
FIG. 6 is a side view of a shape memory polymer actuator, in accordance with yet another embodiment of the invention.

FIG. 6 shows a further variant, an alternative involving printing of an electrically conductive material 72 on a surface or in the interior of the shape memory polymer material 78, to act as a resistive heater. The electrically conductive material could be suitably patterned to achieve the electrical heating in a desired magnitude and at a desired location. The placement of the electrically conductive material may be accomplished in the same additive manufacturing process that is used to print the shape memory polymer material, for instance using different print heads (or extruders) to deposit the shape memory polymer material 78 and the electrically conductive material 72 where desired.

Figure 7:
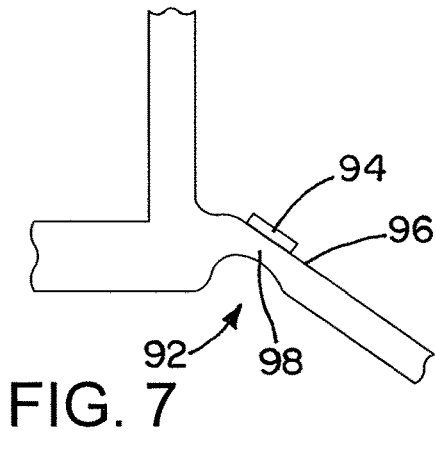
FIG. 7 is a side view of a shape memory polymer actuator, in accordance with still another embodiment of the invention.

FIG. 7 shows another variation, in which an actuator 92 a shape memory alloy material 94 is place atop a surface 96 of a shape memory polymer material 98. Shape memory alloy materials provide a greater shape memory force for changing shape, although shape memory alloy materials have a range of potential shape change (strain) that is less than that of shape memory polymer materials. The shape memory alloy material 94 may be heated in the same way as the shape memory polymer material 98, or the two may be heated in different ways. The actuator 92, relative to one without the shape memory alloy material 94, provides more force and can lead to more fully deployed devices. This could be used if greater accuracy and/or full deployment is required, or if faster deployment is desired.

Figure 8:
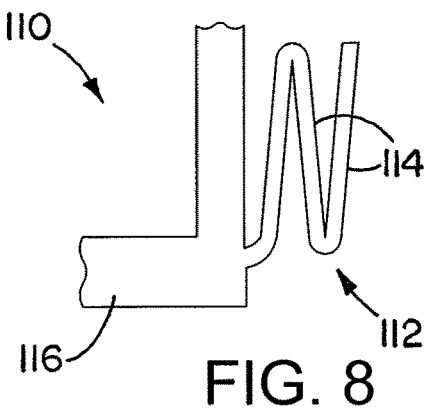
FIG. 8 is a side view of a portion spacecraft with a deployable part in a stowed condition, in accordance with a further embodiment of the invention.
Figure 9:
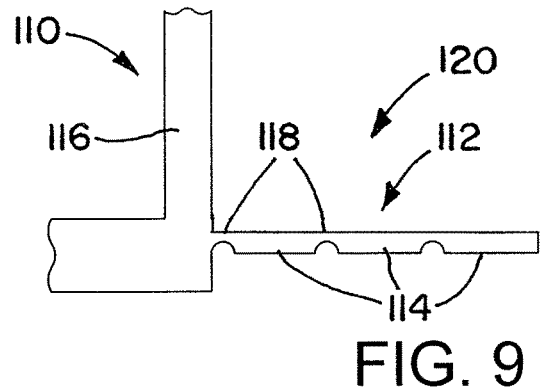
FIG. 9 is a side view of the spacecraft portion of FIG. 8, with the part in the deployed condition.

The deployment of a deployable part may be more complicated than a single rotational movement. FIGS. 8 and 9 show a spacecraft 110 that includes deployable part 112 that has multiple portions 114 in an accordion configuration, which deploy from the stowed condition shown in FIG. 8 to the deployed condition shown in FIG. 9. The deployable part 112 not only rotates as a whole relative to a fuselage 116, but adjacent of the portions 114 relative to one another. At each joint between the portions 114 there is a shape memory polymer material actuator 118, which changes shape upon heating to reach a memory shape previously impressed upon the material. In the illustrated embodiment the deployable part 112 deploys by taking the overlapped portions 114 and putting them all into a plane, which results in a flat part 120, such as a solar panel. However the deployed part could have any of a variety of suitable shapes.

Figure 10:
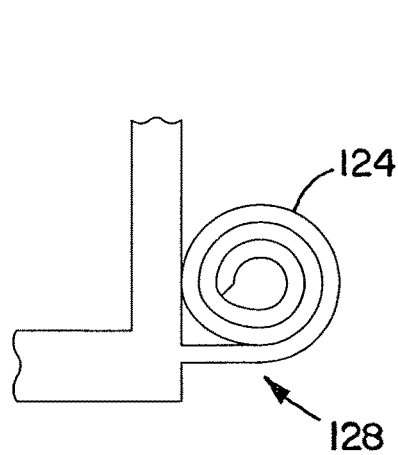
FIG. 10 is a side view of a portion spacecraft with a deployable part in a stowed condition, in accordance with a still further embodiment of the invention.
Figure 11:
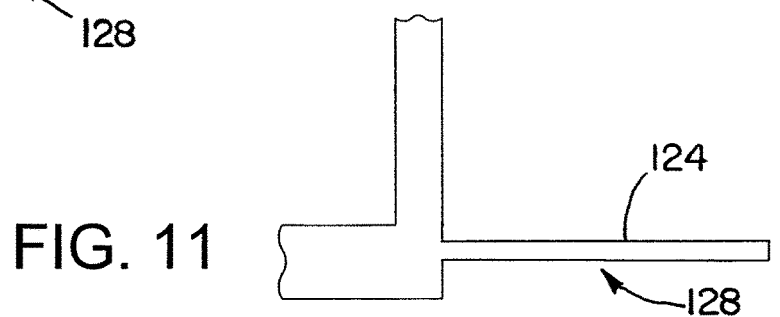
FIG. 11 is a side view of the spacecraft portion of FIG. 10, with the part in the deployed condition.

FIGS. 10 and 11 show another deployment option. In its stowed configuration (FIG. 10) a deployable part 124 is rolled up, while in its deployed configuration (FIG. 11) the part 124 is unrolled to a flat shape. In this embodiment an actuator 128 for the shape change may be all along the length of the part 124, being a substrate for the part 124 or the entire part 124 itself. Alternatively the unrolling may be a relative rotation between a series of fixed shape segments, with thinned portions of shape memory polymer material between them. As another alternative, the deployed shape of an unrolled part may be other than flat, for example having some curvature. The part 124 may be a sunshade for use in screen optical components, to give one example.

The use of shape memory polymer materials in an actuator for deploying a part offers many advantages over prior deployment mechanisms and methods. Solid state mechanisms, such as the shape memory polymer material actuators described above, take up less space and weight than conventional mechanical deployment mechanisms. Using shape memory polymers also enables the use of additive manufacturing, which may lower costs. Having the shape memory polymer actuators integrated with other parts of the spacecraft may also increase structural integrity. Additive manufacturing may also enable rapid prototyping of parts, which can reduce production lead times.

Figure 12:
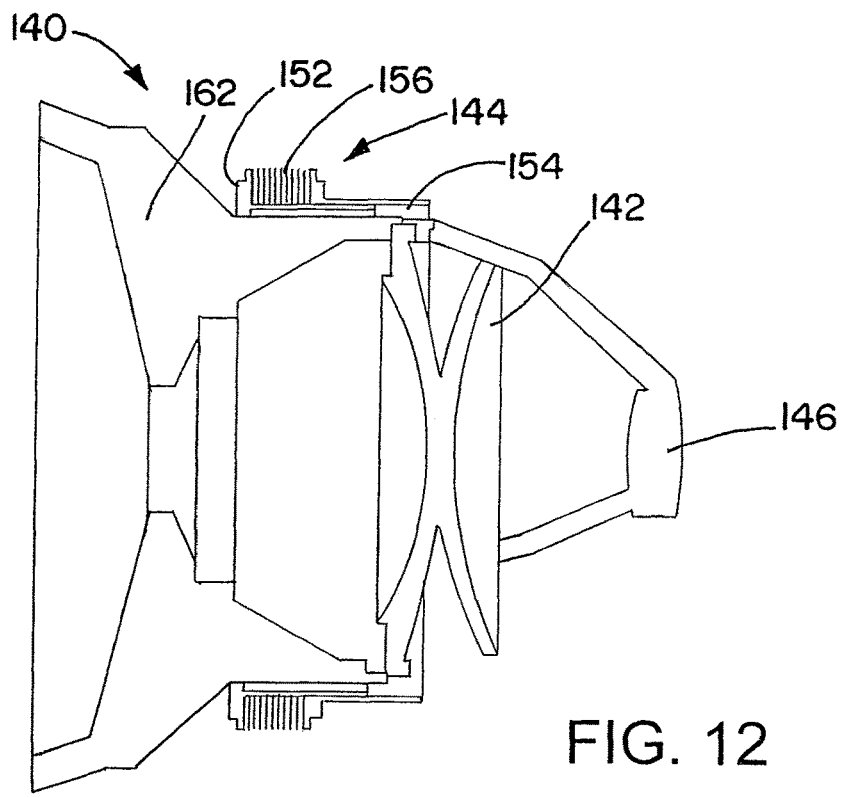
FIG. 12 is a side view of a portion spacecraft with a deployable part in a stowed condition, in accordance with another embodiment of the invention.
Figure 13:
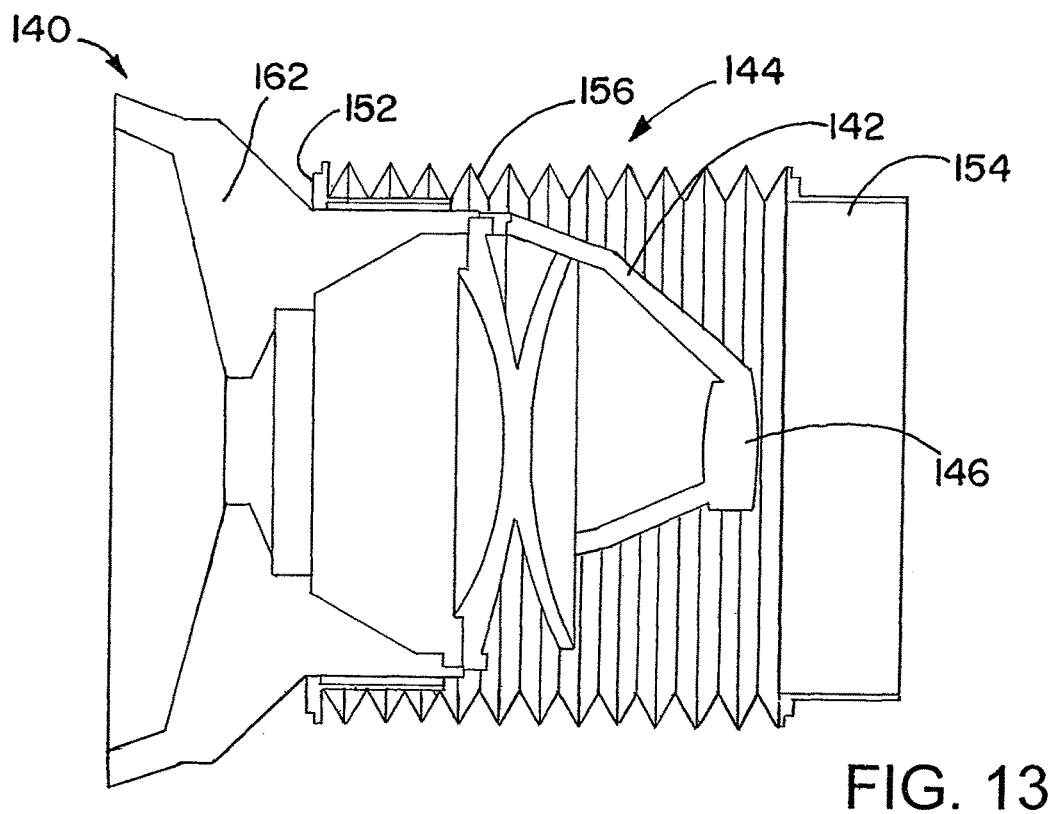
FIG. 13 is an oblique view of the spacecraft portion of FIG. 12, with the part in the deployed condition.

FIGS. 12 and 13 show an embodiment where a spacecraft 140 includes optics 142, and a cylindrical sunshade 144 expands from a compact stowed condition (FIG. 12) to a deployed condition (FIG. 13) that extends outward around a lens 146 at the front end of the optics 142. The sunshade includes a pair of fixed-shape cylindrical end sections 152 and 154, and an accordion middle section 156. In the stowed condition the back end section 152, which is attached to structure 162 of the spacecraft 140 (such as a fuselage), is partially nested within the front end section 154. The accordion middle section 156 expands to separate the two sections 152 and 154, as shown in FIG. 13.

The deployment mechanisms described herein may be small satellites, such as satellites weighing less than 50 kg, which may be launched along with other satellites that are larger or about the same size. Such satellites may be used for any of a variety of purposes, such as for imaging. The deployment mechanisms described herein may also be used as part of other devices.

Figure 14:
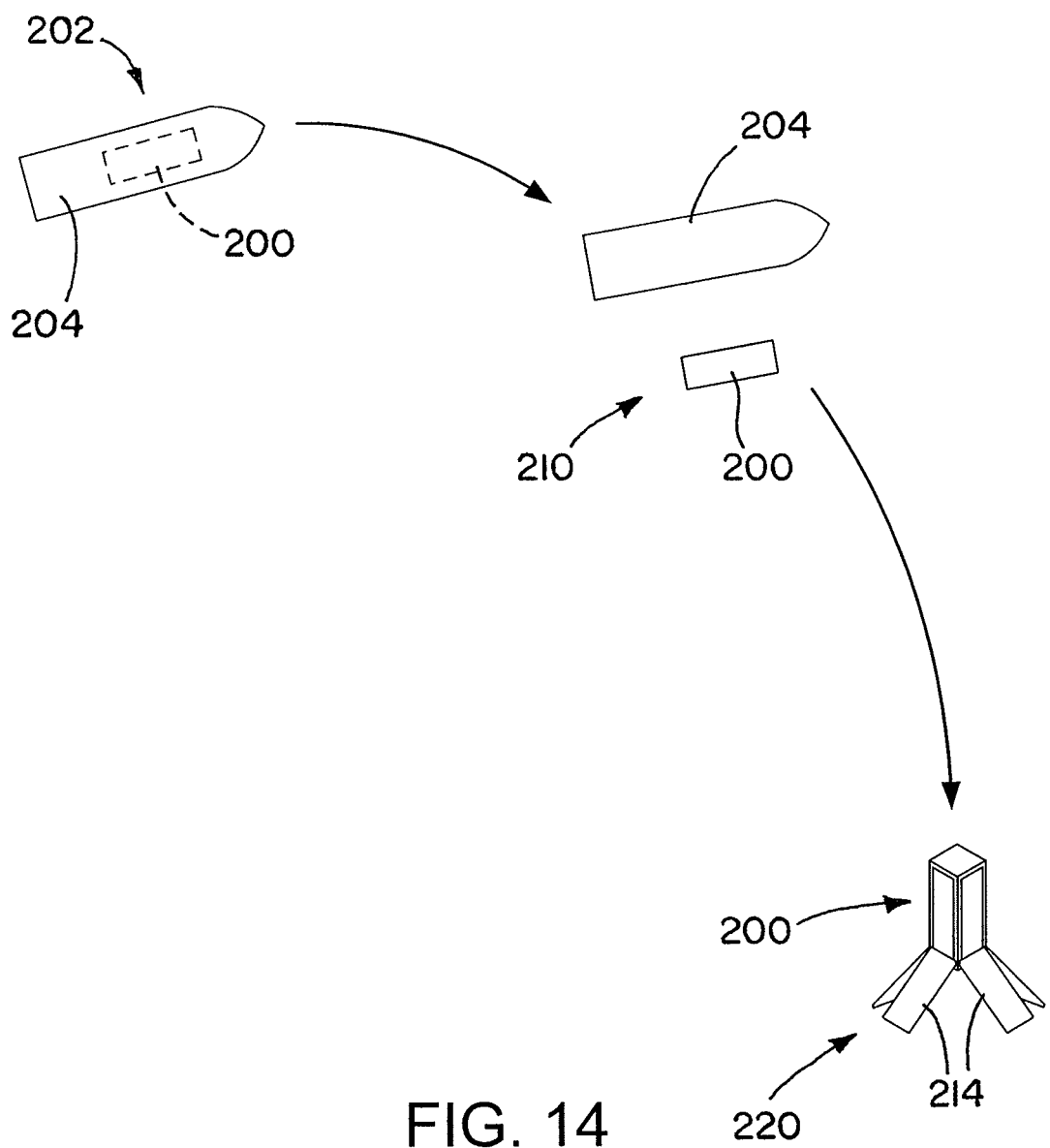
FIG. 14 is a schematic diagram illustrating a process of deploying a spacecraft, such as a satellite, according to an embodiment of the invention.

FIG. 14 illustrates a method of deploying a satellite 200. As shown at 202 the satellite 200 is initially mechanically coupled to a mother craft 204, such as being inside the mother craft 204 or tethered to the mother craft 204.

The satellite 200 then separates from the mother craft 204, as shown at 210. When the satellite 200 initially separates, deployable parts 214 are initially in a stowed condition.

After separation, the parts 214 deploy, as shown at 220. The parts 214 deploy relative to a fuselage of the satellite 200, using shape memory alloy actuators, in any of the ways described above. The parts 214 may deploy at different times, and/or in different ways.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A spacecraft comprising:
    a fuselage;
    a deployable part that is deployable from the fuselage; and
    an actuator that is used to selectively deploy the deployable part;
    wherein the actuator includes:
        a shape memory polymer material; and
        a shape memory alloy material;
    wherein the shape memory polymer material includes a thinned portion that is configured as a pivot location;
    wherein the shape memory alloy material is directly attached to the shape memory polymer material at the thinned portion; and
    wherein heating of the shape memory polymer material and the shape memory alloy material deploys the deployable part by pivoting the deployable part relative to the fuselage at the thinned portion.

2. The spacecraft of claim 1, wherein the actuator and a portion of the deployable part are integrated together to form a single continuous part.

3. The spacecraft of claim 1, wherein the shape memory polymer material and a portion of the fuselage are integrated together to form a single continuous part.

4. The spacecraft of claim 1, wherein the actuator is additively manufactured.

5. The spacecraft of claim 1, wherein the shape memory polymer material includes a filler that enhances ultraviolet (UV) light absorption.

6. The spacecraft of claim 1, further comprising a heat source that is operatively coupled to the shape memory polymer material and the shape memory alloy material.

7. The spacecraft of claim 1, wherein the actuator includes an electrical power source for electrical heating the shape memory polymer material and the shape memory alloy material.

8. The spacecraft of claim 7, wherein the shape memory polymer material includes a filler that enhances electrical conductivity.

9. The spacecraft of claim 7, wherein the actuator includes an electrically conductive material on a surface of the shape memory polymer material, with the electrically conductive material electrically coupled to the electrical power source.

10. The spacecraft of claim 1, wherein the deployable part includes one of an antenna, a solar panel, an optical cover, or a sunshade.

11. The spacecraft of claim 1, wherein the shape memory alloy material and the shape memory polymer material change shape when heated to each provide a force to deploy the deployable part, and wherein the shape memory alloy material and the shape memory polymer material are respectively configured such that the force provided by the shape memory alloy material is greater than the force provided by the shape memory polymer material.

12. A method of deploying a satellite, the method comprising:
    separating the satellite from a mother craft; and
    deploying a deployable part of the satellite by heating a shape memory polymer material and a shape memory alloy material of an actuator;
    wherein the shape memory polymer material includes a thinned portion that is configured as a pivot location;
    wherein the shape memory alloy material is directly attached to the shape memory polymer material at the thinned portion; and wherein the heating of the shape memory polymer material and the shape memory alloy material changes the shape of the shape memory polymer material and the shape memory alloy material to deploy the deployable part by pivoting the deployable part relative to a fuselage of the satellite at the thinned portion.

13. The method of claim 12, wherein the heating includes solar heating of the shape memory polymer material and the shape memory alloy material.

14. The method of claim 12, wherein the heating includes electrically heating the shape memory polymer material and the shape memory alloy material.

\* \* \* \* \*